United States Patent
Seetharamaiah et al.

(10) Patent No.: US 9,280,956 B2
(45) Date of Patent: Mar. 8, 2016

(54) GRAPHICS MEMORY LOAD MASK FOR GRAPHICS PROCESSING

(71) Applicant: QUALCOMM Incorporated, San Diego, CA (US)

(72) Inventors: Avinash Seetharamaiah, Chuluota, FL (US); Christopher Paul Frascati, Oviedo, FL (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 13/688,748

(22) Filed: Nov. 29, 2012

(65) Prior Publication Data

US 2014/0146064 A1  May 29, 2014

(51) Int. Cl.
G09G 5/393 (2006.01)
G09G 5/00 (2006.01)
G06T 1/60 (2006.01)
G06T 15/00 (2011.01)

(52) U.S. Cl.
CPC ........ *G09G 5/393* (2013.01); *G06T 1/60* (2013.01); *G06T 15/005* (2013.01); *G09G 5/001* (2013.01)

(58) Field of Classification Search
CPC ....... G06T 15/503; G06T 15/005; G06T 1/60; G09G 5/001; G09G 5/393
See application file for complete search history.

(56) References Cited

U.S. PATENT DOCUMENTS

| | | | |
|---|---|---|---|
| 6,480,205 B1 | 11/2002 | Greene et al. | |
| 6,636,212 B1* | 10/2003 | Zhu | 345/421 |
| 7,102,646 B1 | 9/2006 | Rubinstein et al. | |
| 7,646,388 B2 | 1/2010 | Noyle | |
| 2003/0002729 A1* | 1/2003 | Wittenbrink | 382/154 |
| 2007/0291030 A1 | 12/2007 | Fowler et al. | |
| 2009/0167758 A1 | 7/2009 | Barczak et al. | |
| 2010/0026682 A1* | 2/2010 | Plowman et al. | 345/419 |
| 2011/0074765 A1 | 3/2011 | Oterhals et al. | |
| 2012/0081370 A1 | 4/2012 | Min | |

FOREIGN PATENT DOCUMENTS

| | | |
|---|---|---|
| EP | 0803797 A1 | 10/1997 |
| EP | 0803798 A1 | 10/1997 |

OTHER PUBLICATIONS

IBM: "Applications Note Understanding VRAM and SGRAM Operation", 1997, Retrieved from the Internet: URL:http://info.ee.surrey.ac.uk/Personai/R.Webb/13a15/extras/vrmsgrm.pdf, 6 pp.
International Search Report and Written Opinion—PCT/US2013/067113—ISA/EPO—Jan. 16, 2014, 13 pp.
International Preliminary Report on Patentability from corresponding PCT Application Serial No. PCT/US2013/067113 dated Jun. 11, 2015 (9 pages).

* cited by examiner

*Primary Examiner* — Maurice L McDowell, Jr.
*Assistant Examiner* — Raffi Isanians
(74) *Attorney, Agent, or Firm* — Shumaker & Sieffert, P.A.

(57) ABSTRACT

Systems and methods are described including creating a mask that indicates which pixel groups do not need to be loaded from Graphics Memory (GMEM). The mask indicates a pixel group does not need to be loaded from GMEM. The systems and methods may further include rendering a tile on a screen. This may include loading the GMEM based on the indication from the mask and skipping a load from the GMEM based on the indication from the mask.

39 Claims, 7 Drawing Sheets

GRAPHICS MEMORY LOAD MASK FOR GRAPHICS PROCESSING

TECHNICAL FIELD

This disclosure relates to techniques for graphics processing, and more specifically to techniques for accessing graphics memory.

BACKGROUND

Graphics processing units are typically used to render two-dimensional (2D) or three-dimensional (3D) content for display. For some devices, for example, mobile devices, which may have limited computing and memory capacity, it may not be possible or may be inefficient to render an entire display screen at one time. Accordingly, such devices may render one portion of the display screen at a time. This process is called "binning" With binning, each portion of the display, called a bin may be processed one at a time, for example, until the entire display is rendered.

Graphics processing units, including those using a binning operation, may be used to draw a user interface (UI). The operation of a UI may include copying data around the screen, for example, when updating and rendering the UI objects (e.g., moving windows). These objects may be moved to different locations within a rendered frame. When this is done, data reads and writes may take up valuable processing cycles or other device resources. Reading and writing data from graphics memory (GMEM) may also take up valuable processing cycles or other valuable devices resources.

SUMMARY

Generally, processing video data for display to a screen may include a load from main memory to GMEM, rendering in GMEM, and a write back to main memory from GMEM. An example according to this disclosure may avoid unnecessary loads to GMEM. Accordingly, the loading of pixels from main memory to GMEM, may be avoided for at least a portion of cases where, for example, pixels have not changed from the last time they were rendered. Data for such pixels may already be stored in main memory and repeating these steps would only write the same data back to main memory for the unchanged pixels.

In an example according to this disclosure, a mask may be created that indicates which pixel or groups of pixels do not need to be loaded to GMEM. This may allow for a load from main memory to GMEM, rendering in GMEM, and a write back to main memory to be avoided or skipped for pixels that have not changed from the last time they were rendered. If no change is required, then a GMEM load may be skipped for that pixel or group of pixels. The mask may be stored in depth buffer for applications that do not use the depth buffer as part of processing depth for screen images.

In one example, the disclosure describes a method including creating a mask that indicates which pixel groups do not need to be loaded to Graphics Memory (GMEM). The mask indicating a pixel group does not need to be loaded to GMEM. The method may rendering a tile of a picture, including loading the GMEM based on the indication from the mask and skipping a load from the GMEM based on the indication from the mask.

In another example, the disclosure describes a device for decoding video data, the device including a video decoder configured to create a mask that indicates which pixel groups do not need to be loaded to GMEM. The mask indicating a pixel group does not need to be loaded to GMEM. The device may render a tile on a screen, including loading the GMEM based on the indication from the mask and skipping a load from the GMEM based on the indication from the mask.

In another example, the disclosure describes a device including means for creating a mask that indicates which pixel groups do not need to be loaded to GMEM. The mask indicating a pixel group does not need to be loaded to GMEM. The device also includes means for rendering a tile on a screen, including means for loading the GMEM based on the indication from the mask and means for skipping a load from the GMEM based on the indication from the mask.

In another example, the disclosure describes a computer program product. The computer program product includes a computer-readable storage medium having stored thereon instructions that, when executed, cause one or more processors of a device to create a mask that indicates which pixel groups do not need to be loaded to GMEM. The mask indicating a pixel group does not need to be loaded to GMEM. The instructions further cause the processor to render a tile on a screen, including load the GMEM based on the indication from the mask and skipping a load from the GMEM based on the indication from the mask.

The details of one or more examples are set forth in the accompanying drawings and the description below. Other features, objects, and advantages will be apparent from the description and drawings, and from the claims.

DETAILED DESCRIPTION

This disclosure generally relates to graphics processing, and more specifically to control of the operation of loads of data to a graphics memory (GMEM). Because loading data to GMEM may take up valuable processing cycles, or other valuable devices resources, it may be advantageous to skip loading data to GMEM if such a load is not required.

Unless a resource, such as GMEM, has been explicitly written to via a "Clear" command to clear an area of memory or block transfer (Blt) command to move blocks of data, a driver (e.g., a graphics driver) may load all of the pixels into GMEM before executing any rendering commands (e.g., draw commands). The Clear and Blt commands give the extents of the region rendered to and therefore informs the driver the region which does not need to be loaded. No other operations give the driver such a hint through the device driver interface (DDI). In practice, applications very frequently will write every pixel via normal rendering commands (e.g., draws). With the clear and Blt commands, the application knows the area of a display that has been "touched." A group of pixels is touched when a known operation has been performed on the group of pixels. For example, if a Blt is performed to cause every pixel to be blue, then every pixel is touched and the system knows each pixel is blue. In another example, a group of pixels may form a primitive, such as a triangle, this group of pixels is touched when, during rasterisation, the primitive for the triangle falls on the pixels. In other words, the pixels will be used to draw the primitive.

Since the application knows it is "touching" every pixel after a Blt or Clear command, it will not clear the resource since, technically, it is a wasted rendering operation and will make the application run slower on most platforms. The driver currently has no way to know that the application has rendered to every pixel, and therefore must load all of the pixels into GMEM, which is an expensive operation. In other words, it takes up system resources. In some UI scenarios, ⅓ of the rendering time may be wasted by loading these pixels into GMEM.

In one example, a load from main memory to GMEM, rendering in GMEM, and a write back to main memory may be avoided for one or more pixels in cases where, for example, pixels have not changed from the last time they were rendered. This is because the data for these unchanged pixels are already stored in main memory, and will be unchanged from one time to the next. Because the data is unchanged, the load from main memory to GMEM, rendering in GMEM, and the write back to main memory might all be skipped as, after such processing, the data stored in main memory for the unchanged pixels is itself unchanged. For example, when a known operation has been performed on a pixel or a group of pixels (e.g., a draw) such that a state of the pixels is known and therefore, it may be determined if the pixels need to be changed. If no change is required, then a GMEM load may be skipped for that pixel or group of pixels. As such, according to one example of this disclosure, a graphics memory load mask may be created that indicates which pixel or pixels do not need to be loaded to GMEM. This may allow for a load from main memory to GMEM, rendering in GMEM, and a write back to main memory to be avoided or skipped for pixels that have not changed from the last time they were rendered.

Figure 1:
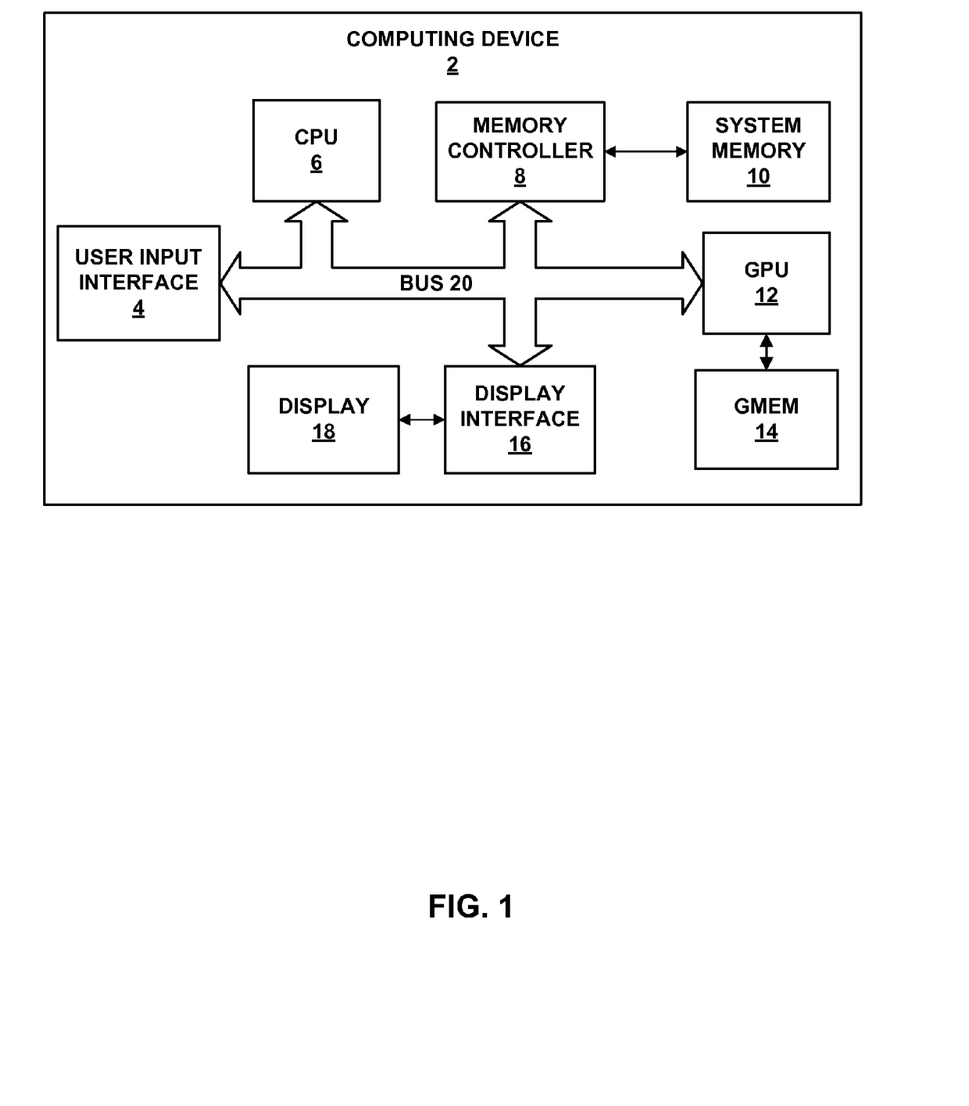
FIG. 1 is a block diagram illustrating an example computing device that may be used to implement the graphics memory load mask of this disclosure.

FIG. 1 is a block diagram illustrating an example computing device 2 that may be used to implement the graphics memory load mask described herein. Computing device 2 may comprise a personal computer, a desktop computer, a laptop computer, a computer workstation, a tablet computer a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a GMEM 14, a display interface 16, a display 18 and bus 20. User input interface 4, CPU 6, memory controller 8, GPU 12 and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include an operating system, a word processor application, an email application, a spreadsheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. For example, the software may be a UI that does not require GPU 12 to use a depth buffer to process depth information. Accordingly, the depth buffer may be used to implement a graphics memory load mask in accordance with the techniques of this disclosure, as will be discussed in more detail below.

In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a DirectX API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, etc.

Memory controller 8 facilitates the transfer of data going into and out of system memory 10. For example, memory controller 8 may receive memory read and write commands, and service such commands with respect to system memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to GMEM 14. Thus, GPU 12 may read data from and write data to GMEM 14 without necessarily using bus 20. In other words, GPU 12 may process data locally using a local storage, instead of non-local memory. This allows GPU 12 to operate in a more efficient manner by eliminating the need of GPU 12 to read and write data via bus 20, which may experience heavy bus traffic. GMEM 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset. Alternatively, display 18 may be a stand-alone device coupled to computing device 2 via a wired or wireless communications link. For instance, display 18 may be a computer monitor or flat panel display connected to a personal computer via a cable or wireless link.

Figure 2:
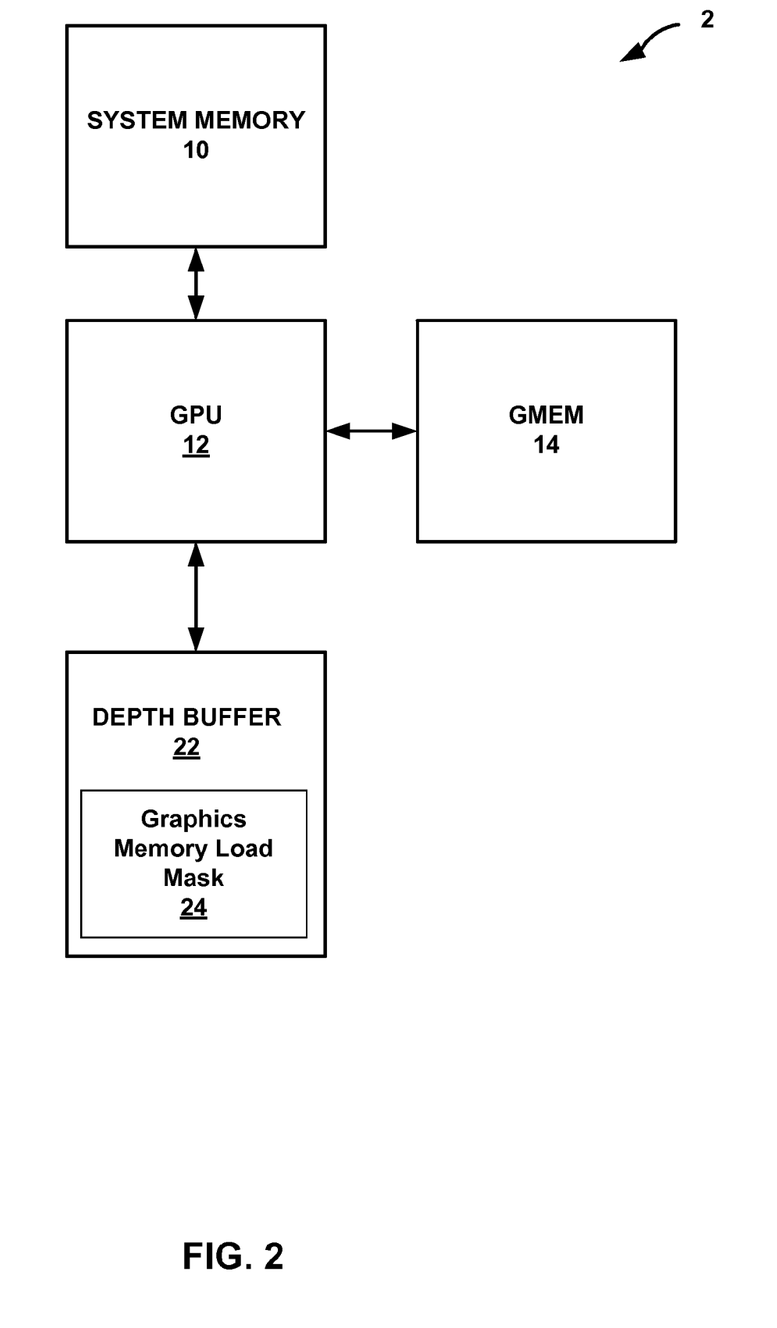
FIG. 2 is a block diagram illustrating an example GPU and memory structure in accordance with one or more examples described in this disclosure.

FIG. 2 is a block diagram illustrating an example system or sub-system 136 of computing device 2 including a GPU 12, a depth buffer 22, GMEM 14, and system memory 10 in accordance with one or more examples described in this disclosure. FIG. 2 provides more detail related to possible functional connections that may also be made between GPUs 12 and vertex buffers and GMEM 14. In an example, GPU 12 creates a graphics memory load mask that indicates which pixel groups do not need to be loaded from GMEM 14. In some examples, depth buffer 22 may be on a chip with GPU 12 and/or other components. In other examples, depth buffer 22 may be a separate buffer.

As described herein, in an example, a graphics memory load mask may be generated during a binning pass. The graphics memory load mask indicating when GMEM 14 loads are needed and when they may be skipped. In other words, when a pixel or group of pixels require a GMEM 14 load and when they do not. In some examples, the graphics memory load mask 24 may be stored in the depth buffer 22. This may occur when the depth buffer 22 is not otherwise being used. For example, when depth buffer 22 is not needed for 3D graphics it may be used for other purposes, such as those described herein. The graphics memory load mask 24 indicates a pixel group does not need to be loaded from GMEM 14 when that pixel group is touched. The group of pixels is touched when, during rasterisation, a primitive falls on the group of pixels, as described with respect to FIG. 6 below. In other words, when a pixel or group of pixels will be used to draw the primitive.

In various examples, processing video data for display to a screen may include a load from system memory 10 to GMEM 14, rendering in GMEM 14, and a write back to system memory 10. An example in accordance with this disclosure may avoid unnecessary loads to GMEM 14. Accordingly, the load from system memory 10 to GMEM 14, rendering in GMEM 14, and a write back to system memory 10 may be avoided in cases where, for example, pixels have not changed from the last time they were rendered.

Figure 4:
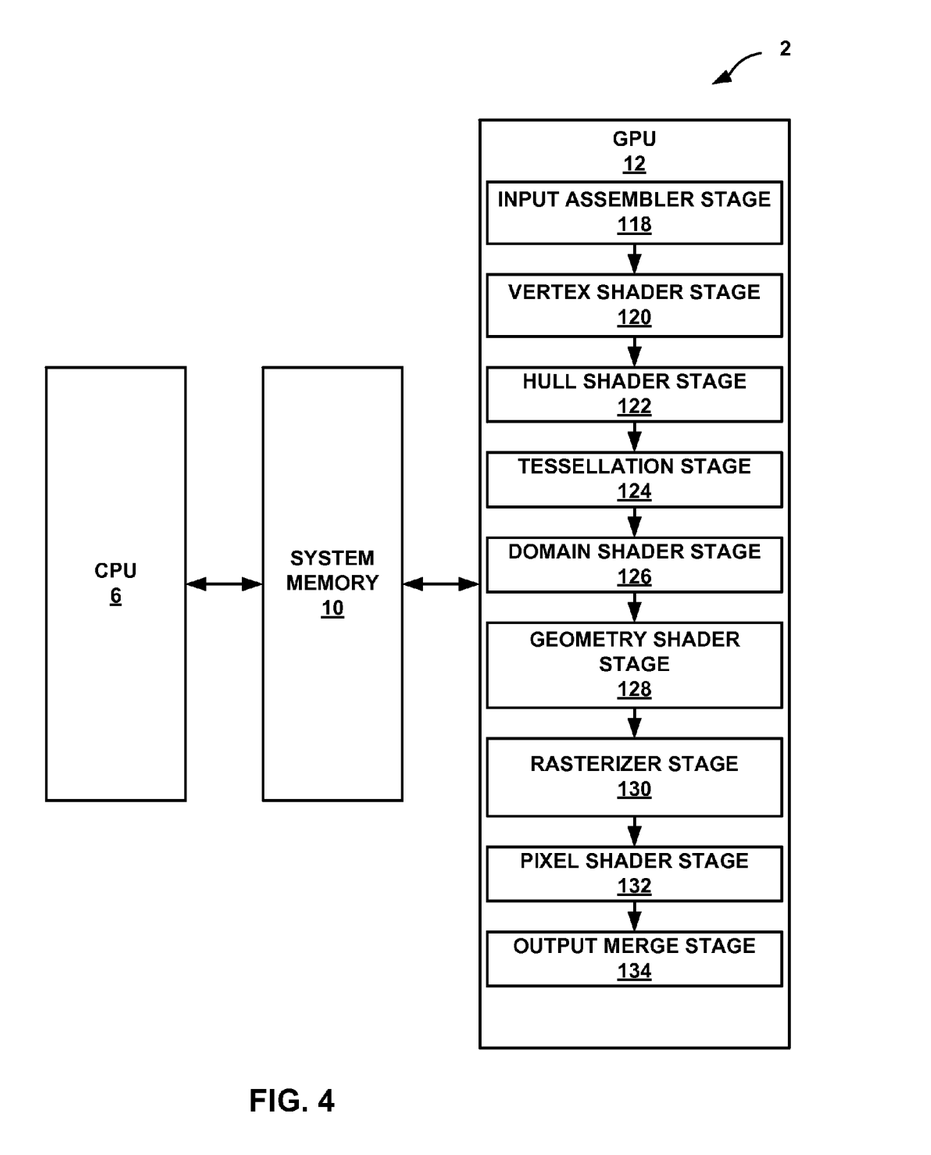
FIG. 4 is a block diagram illustrating an example of a graphics processing unit (GPU) that may implement an example of a graphics processing pipeline in accordance with one or more examples described in this disclosure.

In an example, a graphics memory load mask 24 may be created that indicates which pixel groups do not need to be loaded from GMEM 14 so that the load from system memory 10 to GMEM 14, rendering in GMEM 14, and a write back to system memory 10 may be skipped for pixels that have not changed from the last time they were rendered. The graphics memory load mask 24 may be stored in depth buffer 22 as illustrated in FIG. 4 for applications that do not use the depth buffer 22 as part of processing depth for screen images. In other examples, such as those that use depth buffer 22 for depth information, other memory might be used to store graphics memory load mask 24.

In one example of the disclosure, GPU 12 of computing device 2 may be configured to perform tile-based rendering. Tile-based rendering (sometimes referred to as binning) renders one frame of a scene by breaking the frame into smaller parts (e.g., rectangular tiles or "bins") and rendering each of these parts separately. Tile-based rendering is useful for applications where little dedicated graphics memory is available, such as for mobile applications.

More specifically, in various examples, tile-based rendering may split a surface, e.g., a display, into "bins." Each bin may be rendered individually, rather than rendering the entire display at one time. In some examples, bin size may be determined by format and render target resolution divided into the total amount of GMEM. In other words, the size of GMEM may be related to the size of the bins such that information for all of the pixels in a particular bin may be stored in GMEM at the same time. All pixels for each bin may be stored in this buffer, i.e., GMEM. Additionally, GMEM may have high bandwidth that is matched to the capabilities of the GPU.

Figure 3:
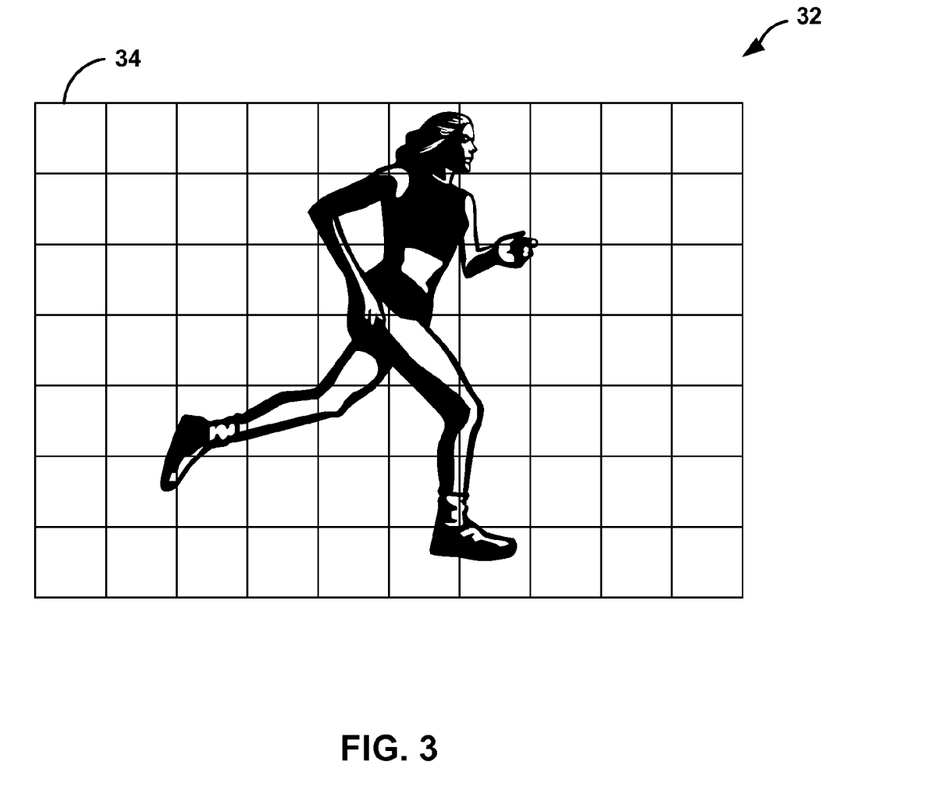
FIG. 3 is a conceptual diagram illustrating tiles of a frame in a tile-based rendering ("binning") architecture.

FIG. 3 is a conceptual diagram illustrating tiles of a frame in a tile-based rendering architecture that may be used in conjunction with computing device 2 of FIG. 1. Frame 32 may be divided into a plurality of tiles, such as tile 34. Graphics processing may then be performed on a per-tile basis to render the entire frame.

In an example in accordance with the techniques of this disclosure, it may be beneficial to determine which pixels have not changed. For example, when a known operation has been performed on a pixel or group of pixels such that a state of the pixels is known and therefore, it may be determined if the pixels need to be changed. If no change is required, then a GMEM load may be skipped for that pixel or group of pixels. It may also be necessary to keep track of this information as the tile 34 is processed. In an example, a graphics memory load mask 24 may be created that indicates which pixel groups do not need to be loaded from GMEM so that the load from main memory to GMEM, rendering in GMEM, and a write back to main memory may be skipped for pixels that have not changed from the last time they were rendered. The graphics memory load mask 24 may be stored in depth buffer 22 for applications that do not use depth buffer 22 as part of processing depth for screen images.

FIG. 4 is a block diagram illustrating an example of a graphics processing unit (GPU) that may implement an example of a graphics processing pipeline in accordance with one or more examples described in this disclosure. For example, GPU 12 may implement techniques for using a depth buffer 22 as a graphics memory load mask 24 to avoid unnecessary data copies into GMEM 14. In some cases other memory locations may be used as the graphics memory load mask 24.

FIG. 4 illustrates an example GPU 12 that may implement a graphics processing pipeline. The graphics processing pipeline includes performing functions as defined by software or firmware executing on GPU 12 and performing functions by fixed-function units that are hardwired to perform very specific functions. The software or firmware executing on the GPU 12 may be referred to as shaders, and the shaders may execute on one or more shader cores of GPU 12. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

The graphics processing pipeline illustrated in FIG. 4 is a graphic processing pipeline substantially as defined by Direct3D 11. In this example, GPU 12 may execute one or more of input assembler stage 118, vertex shader stage 120, hull shader stage 122, tessellation stage 124, domain shader stage 126, geometry shader stage 128, rasterizer stage 131, pixel shader stage 132, and output merge stage 134. GPU 12 may include more stages than those illustrated, and in some examples, GPU 12 may not necessarily include all of the illustrated stages. Also, the specific ordering of the stages is provided for purposes of illustration and should not be considered limiting. For example, graphics pipelines defined according to older DirectX specifications may not include the hull shader stage, tessellation stage, and domain shader stage. The geometry shader stage may also be optional.

In some examples, the execution of the applications on CPU 6 causes CPU 6 to generate a plurality of primitives that connect together to form the viewable content. Examples of the primitives include points, lines, triangles, squares, or any other type of polygon. CPU 6 may define these primitives by their respective vertices. For example, CPU 6 may define coordinates and color values for the vertices. The coordinate values may be 3D coordinates or 2D coordinates.

To perform graphics operations, GPU 12 may implement a graphics processing pipeline. The graphics processing pipeline includes performing functions as defined by software or firmware executing on GPU 12 and performing functions by fixed-function units that are hardwired to perform very specific functions. The software or firmware executing on the GPU 12 may be referred to as shaders, and the shaders may execute on one or more shader cores of GPU 12. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

The graphics processing pipeline illustrated in FIG. 4 is a graphic processing pipeline substantially as defined by Direct3D 11. In this example, GPU 12 may include one or more of input assembler stage 118, vertex shader stage 120, hull shader stage 122, tessellation stage 124, domain shader stage 126, geometry shader stage 128, rasterizer stage 131, pixel shader stage 132, and output merge stage 134. GPU 112 may include more stages than those illustrated, and in some examples, GPU 112 may not necessarily include all of the illustrated stages. In addition, the specific ordering of the stages is provided for purposes of illustration and should not be considered limiting. For example, graphics pipelines defined according to older DirectX specifications may not include the hull shader state, tessellation state, and domain shader stage. The geometry shader stage may also be optional.

Rasterizer stage 130 receives primitives from geometry shader stage 128 and converts the primitives into pixels for the display. For example, the primitives may be defined as vectors that indicate the interconnection of the primitives, and may be defined in a coordinate space that is independent of the display on which the image is to be displayed. Rasterizer stage 130 converts these vectors into the display coordinates, and performs any additional functions such as removing points within primitives that are occluded.

Pixel shader stage 132 receives the pixels as outputted by rasterizer stage 130 and performs post processing to assign color values to each of the pixels that are to be displayed. For example, pixel shader stage 132 may receive constant values stored in system memory 10, texture data stored in system memory 10, and any other data to generate per-pixel outputs such as color values. Pixel shader stage 132 may also output opacity values that indicate the opaqueness of the pixels.

Output merge stage 134 may perform any final pixel processing. For example, output merge stage 134 may utilize depth information to further determine whether any of the pixels should be removed from being displayed. Output merge stage 134 may also perform blending operations to generate final pixel values.

Output merge stage 134 may output the final pixel values to a frame buffer, generally located within system memory 10, but which may be located within GPU 12. A display processor (not shown) may retrieve the pixel values from the frame buffer and cause pixels of a display (not shown) of computing device 2 to illuminate accordingly to the pixel values to cause the display to display the image.

Figure 5:
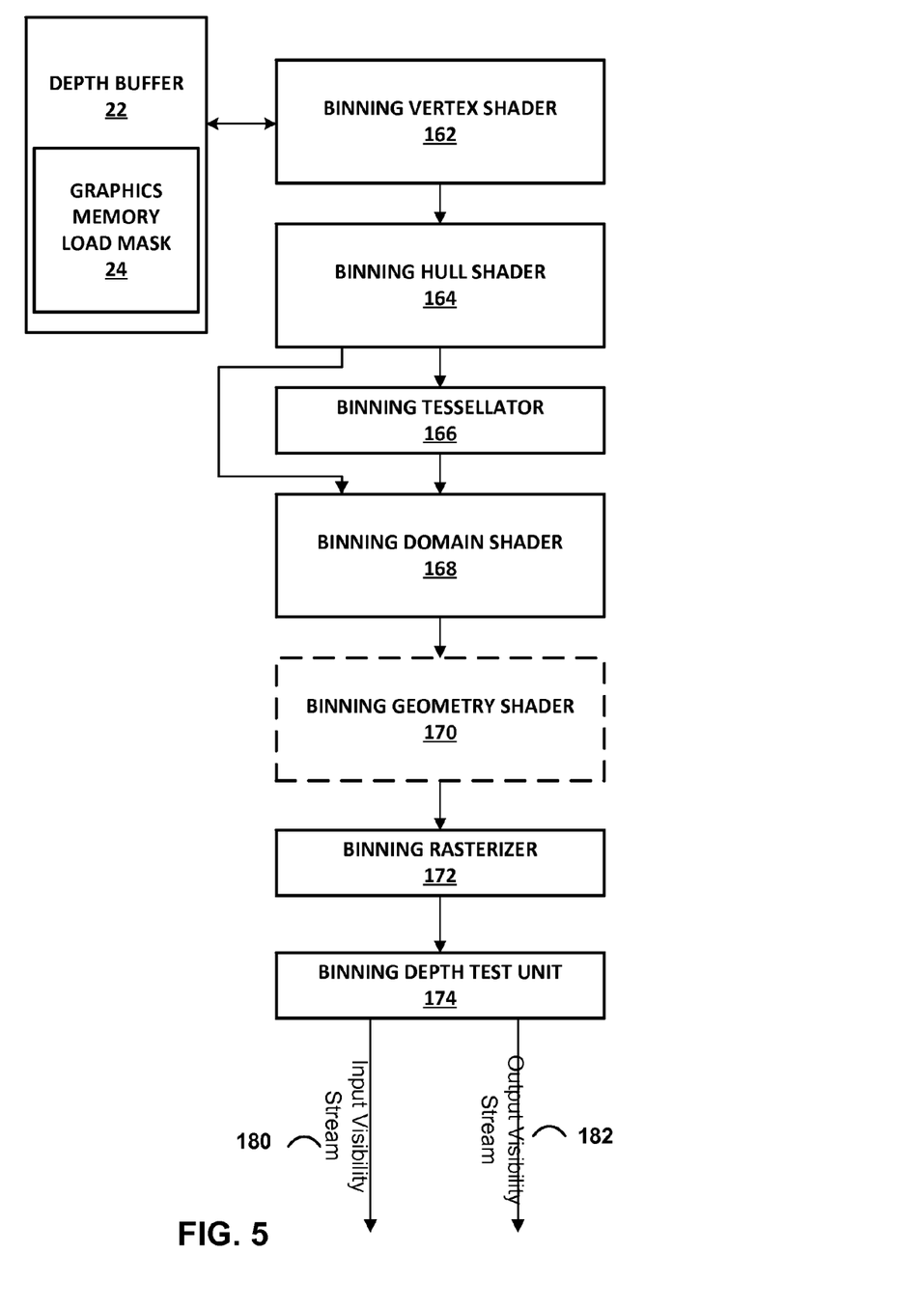
FIG. 5 is a block diagram illustrating an example binning pipeline in accordance with one or more examples described in this disclosure.

FIG. 5 is a block diagram illustrating an example binning pipeline in accordance with one or more examples described in this disclosure. GPU 12 may execute the binning pipeline. The binning pipeline is a simplified version of the full rendering pipeline shown in FIG. 4. For a graphics pipelines that includes the tessellation stages (i.e., HS/TS/DS) and an optional geometry shader, the binning pipeline 160 may include a binning vertex shader 162, a binning hull shader 164, a binning tessellator 166, a binning domain shader 168, an optional binning geometry shader 170, a binning rasterizer 172, and a binning depth test 174.

The binning vertex shader 162 may also be referred to as a binning shader. The binning shader may be a modified version of the vertex shader, where the only output is the vertex position. All parameter exports typically performed by a vertex shader can be removed from the binning shader, as well as any calculations related to them. In an example, vertex shader 162 may write the graphics memory load mask 24 to depth buffer 22. For example, the binning vertex shader in the binning pipeline may be configured to create the graphics memory load mask 24 using the techniques described in this disclosure. Alternatively, a binning vertex shader in the binning pipeline may be modified to create the graphics memory load mask 24 in a depth buffer 22 using the techniques described in this disclosure. For example, as described herein, a graphics memory load mask 24 may be generated during a binning pass. This pass may be performed by binning shader 162. The graphics memory load mask 24 indicates when GMEM 14 loads are needed and when they may be skipped. In other words, when a pixel or group of pixels require a GMEM 14 load and when they do not. In some examples, the binning vertex shader 162 may store the graphics memory load mask 24 in the depth buffer 22. This may occur when the depth buffer 22 is not otherwise being used. For example, when depth buffer 22 is not needed for 3D graphics it may be used for other purposes, such as those described herein.

From the vertices output by the binning vertex shader 162, the binning hull shader 64, the binning tessellator 166, and the binning domain shader produce the tessellated output primitives in the same manner as the tessellation pipeline of FIG. 4 in situations where tessellation is enabled. The binning hull shader 164 and the binning tessellator 166 may be optimized relative to the corresponding stages in the tessellation pipeline of FIG. 4. In particular, the binning hull shader 164 and the binning tessellator 166 may be optimized to compute only position-related variables.

If the geometry shader is enabled for the full rendering pipeline, the binning pipeline 160 may also include a binning geometry shader 170 which produces additional output primitives from the tessellated output primitives produced by the binning tessellator.

The binning rasterizer 172 generates a low-resolution representation of the output primitives in 2D spaces (i.e., pixels). Each pixel represents a pixel area (e.g., a 4×4 pixel area) in the final image. The generated low-resolution pixels can have two values: partially covered or fully covered. The binning rasterizer 172 uses the same culling rules (faceness, frustum, etc.) as a normal rasterization stage, and therefore produces only those triangles that are actually visible to the scene.

The final stage in the binning pass is the binning depth test unit 174 (also called a low-resolution Z test). In some cases, the binning depth test unit 174 determines is the pixels rasterized from the output primitives are visible in the final scene.

Some 3D rasterisation pipelines utilize a "depth test" to determine whether a newly processed pixel is obscured by, or "underneath" a previously rendered pixel. For example, the pipeline illustrated in FIG. 4 may perform such a function. The depth test may involve accessing a depth buffer 22 into which depth values are stored and checked during a pixel shading stage 132 to determine whether the newly processed pixel is obscured by the previously rendered pixel. Essentially any visible pixel's distance from a fixed origin point (e.g., a camera or a viewer point-of-view) is stored as a depth value in the depth buffer 22. Subsequently, another processed pixel may attempt to occupy the same position on the screen. The depth value of the previously rendered pixel may be read and compared with the value of the newly processed pixel. If the comparison result indicates that the new pixel is closer to the origin, then it is deemed to be visible, and the previous depth value of the depth buffer 22 is overwritten with the depth value of the new pixel. The new pixel is further processed by the pipeline, and eventually rendered in a frame buffer. On the other hand, if the comparison result indicates that the new pixel is farther from the origin, then it is deemed to be invisible, and the new pixel is discarded and the previous depth value of the depth buffer 22 is maintained. This process is referred to herein as Hidden Surface Removal (HSR). In examples that do not use 3D images, the depth buffer 22 may be available to provide other functionality. For example, according to techniques of this disclosure, the depth buffer 22 may be used to store a graphics memory load mask 24.

In one example according to the techniques of this disclosure, for applications such as a UI, word processors, spreadsheets, financial programs, and other programs that might not use a depth buffer 22 to process 2D or 3D images, the driver may allocate space in the depth buffer 22 for the graphics memory load mask 24. The space in the depth buffer 22 may use the lowest precision format available. In other words, the graphics memory load mask 24 may not need each of the bits in a particular memory location of the depth buffer 22. For example, 1-bit might be used for each pixel or group of pixels to indicate that a GMEM load may be required or may not be required. Generally, the depth buffer 22 will be larger than 1-bit per storage location. In some examples, more bits might be used to provide additional information about the pixel or group of pixels. For example, auxiliary information might be stored using the additional bits. In another example, the additional bits might be used for other purposes related or unrelated to depth testing or the indication of a GMEM load being required. This may require the use of a read-change-write scheme to update bits in the buffer so that a write to the buffer for one purpose does not inadvertently change any bits used for another purpose.

During the binning pass, a GPU and/or GPU driver implementing the techniques of this disclosure may modify the binning vertex shader, or cause the GPU 12 to load a modified binning vertex shader, so that it outputs a specific "depth value" when the vertex is processed. That "depth value," however, while stored to the depth buffer 22, is actually related to whether a GMEM load is required for a particular pixel or set of pixels. The value may be a bit that indicates if a GMEM load (e.g., a load from main memory to GMEM) is needed or not and is actually not a depth value at all. This value may be stored using a single bit for each storage location.

In an example, during the load from main memory to GMEM, sometimes referred to as an un-resolve pass, access to the graphics memory load mask 24, possibly stored in the depth buffer 22 may be enabled, and any pixel which has a non-zero depth value may be discarded prior to executing the rendering pass (e.g., executing the graphics pipeline). In other words, a non-zero depth value may be rejected or skipped from further graphics pipeline processing rather than processing the non-zero depth value through the entire pipeline to determine if the if the non-zero depth value is needed. During the load from main memory to GMEM, data needs to be copied from system memory back into GMEM. These loads from main memory to GMEM may negatively affect performance and it can be desirable to avoid the un-resolved condition.

Rendering to a display may include a load from main memory to GMEM, rendering in GMEM, and a write back to main memory. In an example, according to techniques of this disclosure, this load/render/write sequence may be skipped based on the indication from the graphics memory load mask 24. For example, some systems, devices and methods may create a graphics memory load mask 24 that indicates which pixel groups do not need to be loaded from GMEM. The graphics memory load mask 24 indicates a pixel group that does not need to be loaded from GMEM when that pixel group is touched. A group of pixels is touched when a known operation has been performed on that group of pixels. For example, if a Blt is performed to cause every pixel to be blue, then every pixel is touched and the system knows each pixel is blue. In another example, a pixel group may be considered touched when, during rasterisation, a primitive falls on the group of pixels. In other words, when the group of pixels are activated to draw the primitive on the screen. This concept is discusses in detail with respect to FIG. 6.

An example method may be implemented in software. In such an example, the graphics memory load mask 24 may be stored in a depth buffer 22. For example, the depth buffer 22 may be used to store the graphics memory load mask 24 when applications that do not processed 3D graphics, or applications that do not utilize the depth buffer 22 for depth testing, are run. In some examples, the techniques of this disclosure may be applied to, for example, the User Interface (UI). This is because the UI generally does not render 3D graphics to the screen. Accordingly, generally the UI does not use the depth buffer 22, which allows the driver to use it in an unconventional way to store the graphics memory load mask 24. Other example applications that might not render 3D graphics and might not use the depth buffer 22 for processing depth calculations might include word processors, spreadsheets, browsers and other types of programs. It will be understood, however, that different programs may render 3D graphics in some cases and not in other cases, for example, a browser may render graphics for a web page that is 3D in some cases and 2D in other cases. In another example, dedicated hardware may be used to accumulate the graphics memory load mask 24. In some examples, a device implementing these techniques may process bins including increments of ½ pixel.

As discussed above, in examples that do not use a depth buffer 22, a driver may modify or load a modified version of a binning vertex shader, e.g. binning vertex shader 162, that is configured to allocate space in the depth buffer 22 for a graphics memory load mask 24. The graphics memory load mask 24 may use the lowest precision format available. Accordingly, fewer bits may be used than the total number of bits in each memory location in the depth buffer 22. For example, 1-bit might be used for each pixel or group of pixels to indicate that a GMEM 14 load may be required or may not be required. In an example, a binary "0" in a particular bit of a memory location of the depth buffer 22 may indicate that a GMEM 14 load is not necessary, while a binary "1" in a particular bit of a memory location of the depth buffer 22 may indicate that a GMEM 14 load is necessary. It will be understood that the memory locations in the depth buffer 22 are generally larger than one bit. For example, the depth buffer 22 may be 8 bits, 16 bits, 24 bits, 32 bits, 64 bits, etc., although some systems might not use 8 bits due to the limited precision provided by so few bits. When using the depth buffer 22 for a graphics memory load mask 24, 8 bits, 16 bits, 32 bits, etc., are not generally needed. Rather, there may generally be two possibilities, either a GMEM 14 load is needed or a GMEM 14 load is not needed, which may be stored in a single bit. Accordingly, in many examples, a single bit in each memory location of the depth buffer 22 might be used. In other examples, multiple bits may be used to store additional information. For example, one bit may be used in conjunction with a lower precision depth buffer to process 3D images using these techniques. This may require the use of a read-change-write scheme to update bits in the buffer so that a write to the buffer for one purpose does not inadvertently change any bits used for another purpose.

Generally, when processing a UI, or other 2D screens, a binning pass may be skipped because the images that need to be displayed are generally not particularly complex when compared to 3D images. In accordance with the techniques of this disclosure, however, a binning pass might be used to generate a graphics memory load mask 24. For example, the vertex shader stage 120 may be configured such that, during such a binning pass, it outputs a specific value when a vertex is processed. The value may indicate if a GMEM 14 load is required or if a GMEM 14 load is not required. This value may then be stored to the depth buffer 22. Additionally, this binning pass provides a first pass through the data that is to be displayed and allows for pre-processing of this data to determine which, if any pixels, have changed and which have not changed. During the binning pass an example system may determine which specific primitive, e.g., triangle is visible in a bin or not visible in a bin. Accordingly, information for primitives that are not visible may be skipped.

In the example systems and methods described herein, however, a binning pass may be run on the UI to generate the graphics memory load mask 24. During the binning pass when the changed and unchanged pixels are determined, the system may determine the need for GMEM 14 loads for the pixels or groups of pixels. If the pixel or group of pixels are unchanged, no GMEM 14 load is needed. If the pixel or group of pixels are changed a GMEM 14 load may be needed.

The data related to GMEM 14 loads for particular pixels or groups of pixels generated during the binning pass may be stored in a graphics memory load mask 24. The graphics memory load mask 24 may be stored in the depth buffer 22. Accordingly, after the binning pass, during the rendering pass the depth buffer 22 may be read to determine when GMEM 14 loads are required. Thus, when required GMEM 14 may be loaded. When such a load is not required, however, the GMEM 14 load may be skipped.

In accordance with the techniques of this disclosure, during a load from main memory to GMEM access to the depth buffer 22 may be enabled. In other words, data may be read from the depth buffer 22. In accordance with the techniques of this disclosure the data will not be true depth data, but for example may be an individual bit in each memory location that indicate if a load to GMEM is needed for a particular pixel. For example, if binary "0" is used to indicate a GMEM load is needed and a binary "1" is used to indicate a GMEM load is not needed, any pixel which has a non-zero depth value will be discarded prior to pixel shader stage 132 execution. In other words, a non-zero depth value may be rejected or skipped from further graphics pipeline processing rather than processing the non-zero depth value through the entire pipeline to determine if the if the non-zero depth value is needed.

Figure 6:
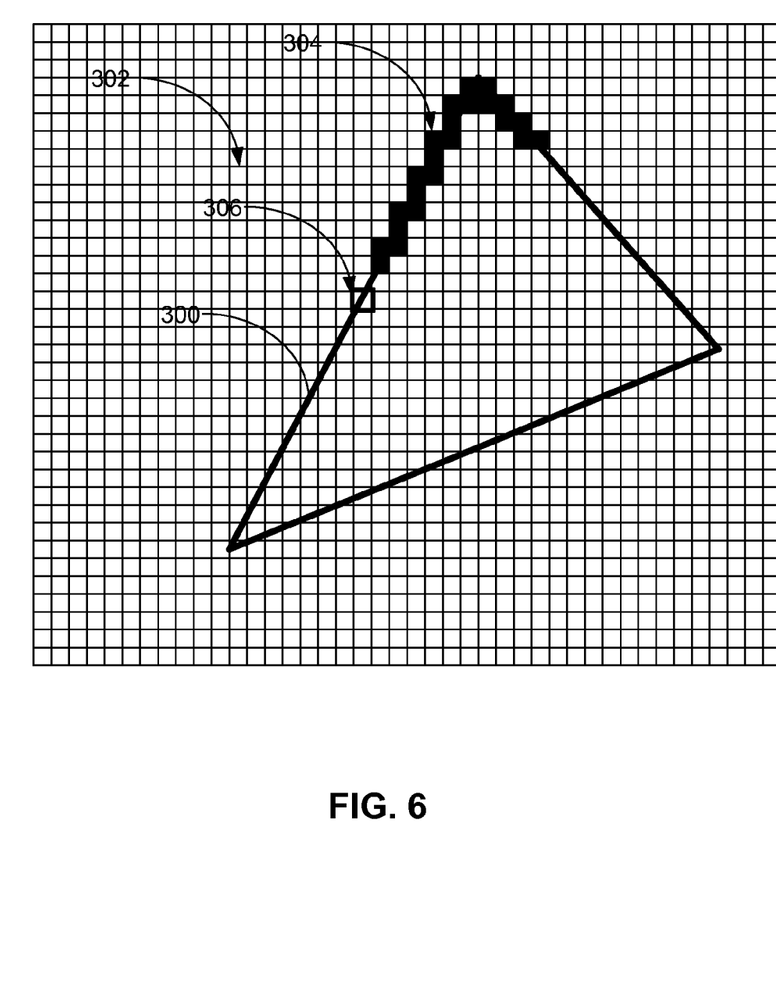
FIG. 6 is a diagram illustrating an example of rasterisation.

FIG. 6 is a conceptual diagram illustrating an example of rasterisation. Rasterisation (sometimes spelled rasterization) is the task of taking an image described in a vector graphics format (shapes) and converting the image into a raster image (pixels or dots) for output on a video display or printer, or for storage in a bitmap file format.

Referring now to FIG. 6, a triangle 300 is illustrated overlaid on a series of squares representing pixels 302. The image of triangle 300 may be described in a vector graphics format (shapes). As illustrated in FIG. 6, various pixels 304 may be used output an image of the triangle on a video display or printer, or for storage in a bitmap file format, for example, after the image is converted into a raster image (pixels or dots) for output. Only a subset of the pixels 304 needed to represent triangle 300 are illustrated such that the underlying vector graphics format triangle 300 is visible. It will be understood that the figures of this application may be printed or rendered in a rasterisation format. Notwithstanding this, triangle 300 is intended to represent a vector graphics format.

As described herein some video systems may create a graphics memory load mask 24 that indicates which pixel groups do not need to be loaded from GMEM 14. The graphics memory load mask 24 may indicate a pixel group does not need to be loaded from GMEM 14 when that pixel group has had a known operation performed on them such that a state of the pixels is known and therefore, it may be determined if the pixels need to be changed. FIG. 6 illustrates an example of pixels that have had a known operation performed on them such that a state of the pixels is known and therefore, it may be determined if the pixels need to be changed. Pixels 304 are examples of pixels that are drawn. In other words, after various transformations from world coordinates (e.g., a vector shape) to pixels, the particular pixel 304 were get rasterized, e.g., these pixels 304 will be rendered. The group of pixels 304 are drawn because, during rasterisation, a primitive (triangle 300) falls on the group of pixels 304. In other words, the group of pixels 304 are pixels that will be used to draw the triangle on the screen.

In some cases, however, even if pixels are touched, they might not need to be loaded from GMEM 14. For example, GMEM 14 might not need to be loaded because the group of pixels have not changed.

Triangle 302 of FIG. 6 may be rendered as part of a tile on a screen. This may include loading the GMEM 14 based on the indication from the graphics memory load mask 24 and skipping a load from the GMEM 14 based on the indication from the graphics memory load mask 24. For example, GMEM 14 loads may be skipped for unchanged pixels. The load will generally not be skipped for pixels that are visible and have changed since, for example, the last graphics processing operation on the particular tile containing the pixels.

In various examples, a graphics memory load mask 24 may be generated to indicate when these GMEM 14 loads are and are not needed. This graphics memory load mask 24 indicating that a GMEM load is required for pixel 306 may be stored in the depth buffer 22 when it is not otherwise in use, e.g., for a UI that does use depth. When the opaque pixel at 306 is processed during the binning pass a bit may be written to depth buffer 22 that indicates that a GMEM 14 load is not required if, for example, the pixel has not changed from the last time it was processed. When a pixel that has been changed is processed during a binning pass a bit may be written to depth buffer 22 indicating that a GMEM 14 load is required.

Figure 7:
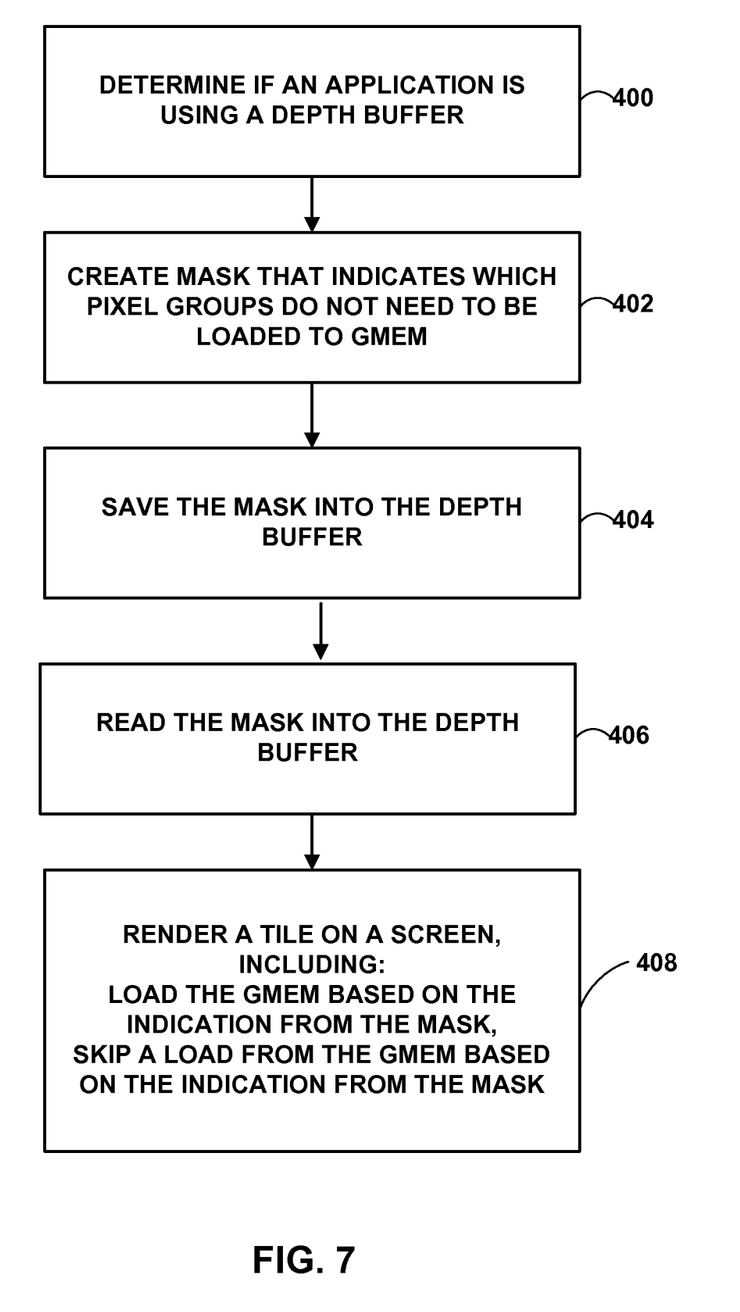
FIG. 7 is a flowchart illustrating an example method in accordance with one or more examples described in this disclosure.

FIG. 7 is a flowchart illustrating an example method for using a depth buffer 22 as a graphics memory load mask 24 to avoid unnecessary data copies into GMEM 14. In an example, the GPU 12 may determine if the depth buffer 22 is being used (400). This may be done to determine if graphics memory load mask 24 may be saved to the depth buffer 22. In some examples, these techniques might not be used if the depth buffer is in use. In other examples, the graphics memory load mask 24 might be stored to other memory. In some cases, this step might be skipped, for example, if the depth buffer is not used to store the graphics memory load mask 24.

The GPU 12 may generate a graphics memory load mask 24 based on the changed/unchanged information (402). In this example, GPU 12 may create a graphics memory load mask 24 that indicates which pixel groups do not need to be loaded to GMEM 14. The GPU may save the graphics memory load mask 24 to the depth buffer 22 in some examples (404). This may occur when the depth buffer 22 is not otherwise being used. For example, when depth buffer 22 is not needed for 3D graphics it may be used for other purposes, such as those described herein. In other examples, the graphics memory load mask 24 might be saved to other memory locations (404). This might be required when the depth buffer is being used by an application for 3D rendering, for example.

The graphics memory load mask 24 may indicate a pixel group that does not need to be loaded to GMEM 14 when that pixel group has had a known operation that has been performed on it and a state of the pixels is known and it may be determined if the pixels need to be changed. For example, when, during rasterisation, a primitive falls on the group of pixels and that primitive has to be drawn because it has not been drawn before a load to GMEM 14 will generally be needed. Accordingly, the depth buffer 22 acts as a "load or don't load mask." In an example, when a pixel is processed in a binning pass and it is determined that the pixel has not changed a bit may be written to depth buffer 22 that indicates that a GMEM 14 load is not required. When a pixel that has been changed is processed in a binning pass a bit may be written to depth buffer 22 indicating that a GMEM 14 load is required. This information may be generated during an initial binning pass. For example, the initial binning pass may be used to determine which specific primitive, e.g., triangle is visible in a bin or not visible in a bin. Accordingly, information for primitives that are not visible may be skipped. In some systems, the UI may not include a binning pass. This is because the geometry in the UI may be simple. Accordingly, the processing may be more simple. In the example systems and methods described herein, however, a binning pass may be run on the UI to generate the graphics memory load mask 24. Accordingly, during the binning pass changed and unchanged pixels may be determined. If the pixel or group of pixels is unchanged, no GMEM 14 load is needed. If the pixel or group of pixels is changed a GMEM 14 load is needed. In this case, the binning pass may include some processing to determine which pixels are a known operation has been performed on such that a state of the pixels is known. It may also be determined which pixels are changed. Accordingly, a bit may be written to the depth buffer 22 to indicate that a pixel is touched and changed and will require a GMEM 14 load. Accordingly, the mask may be saved to the depth buffer one bit at a time (404). After the binning pass, during the rendering pass the depth buffer 22 may be read to determine when GMEM 14 loads are required (406).

In an example, a graphics processor may also rendering a tile on a screen (408). This rendering may include loading the GMEM 14 based on the indication from the graphics memory load mask 24 and skipping a load from the GMEM 14 based on the indication from the graphics memory load mask 24 (402).

In an example, the graphics processor may determine if an operating system is using a depth buffer 22. When the depth buffer 22 is not in use by the operating system, the graphics processor the may save the graphics memory load mask 24 into a depth buffer 22. The graphics memory load mask 24 may be read from the depth buffer 22 by the graphics processor during a render to determine if a GMEM 14 load is required.

Various size pixel groups may be processed using the systems and methods described herein, for example, processing a 1 by 1 pixel group, a 2 by 2 pixel group, a 4 by 4 pixel group, a 16 by 16 pixel group, a 32 by 32 pixel group, 64 by 64 pixel group, a 128 by 128 pixel group, a 256 by 256 pixel group, processing an n by n pixel group, wherein n is an integer between 1 and 256, or processing an m by n pixel groups where m and n are integers between 1 and 256, m not equal to n.

In some cases, some pixels on a screen may be opaque, while other pixels may be translucent. The opaque pixels block any objects "below" them on the screen. The translucent pixels do not block objects below them. Rather, to some degree objects below opaque pixels are still visible. Accordingly, the pixels of an opaque object may be blended with the pixels below it such that the pixels below the opaque pixels remain visible. The blending of pixels necessitates a GMEM 14 load. For example, there may be data for one item on the screen. If a translucent pixel is placed on top of this item, both the translucent pixel and the previous item will generally be visible. The translucent pixel may not be completely translucent and thus may affect the pixel below it. Thus, the pixels may be blended together. This blending will require a load from GMEM 14 because data from multiple pixels or multiple sets of pixels is required. Accordingly, in some examples, the techniques of this disclosure might not be used in conjunction with tiles that include blending. In other examples, however, blending may be tracked in the graphics memory load mask 24 on a pixel-by-pixel basis to allow for unnecessary GMEM loads to be avoided for unblended pixels, even when some pixels within a frame are blended.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method comprising:
    creating a mask that indicates whether pixel groups should be loaded to Graphics Memory (GMEM);
    storing the mask into a depth buffer; and
    loading pixel groups from main memory into the GMEM, wherein loading includes testing the mask stored in the depth buffer and loading the GMEM with pixel groups from main memory that the mask indicates should be loaded to the GMEM;

wherein testing the mask includes enabling a depth testing function and depth testing the mask read from the depth buffer using the depth testing function; and wherein creating a mask includes determining if an application uses the depth buffer to process depth information and only creating the mask if the application is not using the depth buffer to process depth information.

2. The method of claim 1, wherein the mask indicates a pixel group does not need to be loaded to GMEM when a known operation has been performed on the group of pixels such that a state of the pixels is known and the pixel group is unchanged from a previous operation.

3. The method of claim 1, wherein the application processes 2-dimensional images.

4. The method of claim 1, further comprising modifying a binning vertex shader in a binning pipeline to create the mask stored in the depth buffer.

5. The method of claim 1, further comprising using a binning vertex shader in a binning pipeline to create the mask stored in the depth buffer, the vertex shader determining when a known operation has been performed on the group of pixels such that a state of the pixels is known and the vertex shader determining that the pixel group is unchanged from a previous operation.

6. The method of claim 1, further comprising reading the mask from the depth buffer during a render to determine if a GMEM load is required.

7. The method of claim 1, further comprising processing bins including increments of ½ pixel.

8. The method of claim 1, wherein the mask comprises a 1-bit per pixel mask.

9. The method of claim 1, wherein the mask comprises a 2-bit per pixel mask.

10. The method of claim 1, wherein the pixel group comprises a single pixel.

11. The method of claim 1, wherein nonzero values in the mask stored in the depth buffer indicate pixel groups that should not be loaded to the GMEM.

12. A device for processing graphics data, the device comprising:
a Graphics Memory (GMEM) configured to store pixel groups; and
one or more processors in communication with the GMEM, the one or more processors configured to:
create a mask that indicates whether pixel groups should be loaded to the GMEM;
store the mask into a depth buffer; and
load pixel groups from main memory into the GMEM, wherein loading includes testing the mask in the depth buffer and loading the GMEM with pixel groups from main memory that the mask indicates should be loaded to the GMEM;
wherein testing the mask includes enabling a depth testing function and depth testing the mask read from the depth buffer using the depth testing function; and
wherein one of the processors configured to create a mask is also configured to determine if an application is using the depth buffer to process depth information and to only create the mask if the application is not using the depth buffer to process depth information.

13. The device of claim 12, wherein the mask indicates a pixel group does not need to be loaded to GMEM when a known operation has been performed on the group of pixels such that a state of the pixels is known and the pixel group is unchanged from a previous operation.

14. The device of claim 12, wherein the application processes 2-dimensional images.

15. The device of claim 12, further comprising a binning vertex shader in a binning pipeline to create the mask stored in the depth buffer, the vertex shader determining when a known operation has been performed on the group of pixels such that a state of the pixels is known and the vertex shader determining that the pixel group is unchanged from a previous operation.

16. The device of claim 12, further configured to read the mask from the depth buffer during a render to determine if a GMEM load is required.

17. The device of claim 12, wherein the device processes bins including increments of ½ pixel.

18. The device of claim 12, wherein the mask comprises a 1-bit per pixel mask.

19. The device of claim 12, wherein the mask comprises a 2-bit per pixel mask.

20. The device of claim 12, wherein the pixel group comprises a single pixel.

21. The device of claim 12, wherein nonzero values in the mask stored in the depth buffer indicate pixel groups that should not be loaded to the GMEM.

22. A device comprising:
means for creating a mask that indicates whether pixel groups should be loaded to Graphics Memory (GMEM);
means for storing the mask into a depth buffer; and
means for loading pixel groups from main memory into the GMEM, wherein the means for loading includes means for testing the mask stored in the depth buffer and means for loading the GMEM with pixel groups from main memory that the mask indicates should be loaded to the GMEM;
wherein the means for testing the mask includes a depth testing function and tests the mask read from the depth buffer using the depth testing function; and
wherein the means for creating a mask determines if an application is using the depth buffer to process depth information and creates the mask if the application is not using the depth buffer to process depth information.

23. The device of claim 22, wherein the mask indicates a pixel group does not need to be loaded to GMEM when a known operation has been performed on the group of pixels such that a state of the pixels is known and the pixel group is unchanged from a previous operation.

24. The device of claim 22, wherein the application processes 2-dimensional images.

25. The device of claim 22, wherein the means for creating a mask includes a binning vertex shader used to create the mask stored in the depth buffer, the vertex shader determining when a known operation has been performed on the group of pixels such that a state of the pixels is known and the vertex shader determining that the pixel group is unchanged from a previous operation.

26. The device of claim 22 wherein the device processes bins including increments of ½ pixel.

27. The device of claim 22, wherein the mask comprises a 1-bit per pixel mask.

28. The device of claim 22, wherein the mask comprises a 2-bit per pixel mask.

29. The device of claim 22, wherein the pixel group comprises a single pixel.

30. The device of claim 22, wherein nonzero values in the mask stored in the depth buffer indicate pixel groups that should not be loaded to the GMEM.

31. A non-transitory computer-readable storage medium having stored thereon instructions that, when executed, cause one or more processors of a device to:

create a mask that indicates whether pixel groups should be loaded to GMEM;
store the mask into a depth buffer; and
load pixel groups from main memory into the GMEM, wherein loading includes testing the mask stored in the depth buffer and loading the GMEM with pixel groups from main memory that the mask indicates should be loaded to the GMEM;
wherein testing the mask includes enabling a depth testing function and depth testing the mask read from the depth buffer using the depth testing function; and
wherein one of the processors configured to create a mask is also configured to determine if an application is using the depth buffer to process depth information and to only create the mask if the application is not using the depth buffer to process depth information.

32. The computer-readable storage medium of claim 31, wherein the mask indicates a pixel group does not need to be loaded to GMEM when a known operation has been performed on the group of pixels such that a state of the pixels is known and the pixel group is unchanged from a previous operation.

33. The computer-readable storage medium of claim 31, wherein the instructions, when executed, further cause one or more processors of a device to implement a binning vertex shader in a binning pipeline configured to create the mask in a depth buffer.

34. The computer-readable storage medium of claim 31, wherein the instructions, when executed, further cause one or more processors of a device to provide a binning vertex shader in a binning pipeline configured to create the mask stored in the depth buffer.

35. The computer-readable storage medium of claim 31, wherein the instructions, when executed, further cause one or more processors of a device to read the mask from the depth buffer during a render to determine if a GMEM load is required.

36. The computer-readable storage medium of claim 31, wherein the mask comprises a 1-bit per pixel mask.

37. The computer-readable storage medium of claim 31, wherein the mask comprises a 2-bit per pixel mask.

38. The computer-readable storage medium of claim 31, wherein the pixel group comprises a single pixel.

39. The computer-readable storage medium of claim 31, wherein the instructions that, when executed, cause one or more processors of a device to store the mask into a depth buffer further include instructions that, when executed, cause one or more processors of a device to determine if an application uses the depth buffer to process depth information and instructions that, when executed, cause one or more processors of a device to store the mask into the depth buffer only when the application does not use the depth buffer to process depth information, and
wherein nonzero values in the mask stored in the depth buffer indicate pixel groups that should not be loaded to the GMEM.

* * * * *